United States Patent [19]

Mollura

[11] 4,218,274
[45] Aug. 19, 1980

[54] METHOD OF CONSTRUCTING A BAFFLED WATERBED MATTRESS

[76] Inventor: Carlos A. Mollura, 2824 Del Oro Pl., Fullerton, Calif. 92632

[21] Appl. No.: 27,369

[22] Filed: Apr. 5, 1979

[51] Int. Cl.² .......................... B29C 27/04; H05B 7/06
[52] U.S. Cl. .......................................... 156/65; 5/451; 156/273; 219/10.41; 219/10.53; 219/10.81
[58] Field of Search ............... 156/65, 273, 292, 297, 156/380, ; 5/279 C, 451; 219/10.53, 10.81, 10.41

[56] References Cited

U.S. PATENT DOCUMENTS

| 1,970,803 | 8/1934 | Johnson | 156/292 |
| 2,660,660 | 11/1953 | Von Hauteville | 156/380 |
| 2,948,929 | 8/1960 | Stallard | 219/10.53 |
| 4,124,427 | 11/1978 | Vecchiotti | 156/380 X |

Primary Examiner—Michael G. Wityshyn
Attorney, Agent, or Firm—Flam & Flam

[57] ABSTRACT

A waterbed mattress is provided with a series of unitary baffles each comprising a web joined at opposite ends to circular attachment flanges. A floating die of substantially cylindrical form surrounds the central web during the welding process in which substantially flat parts of the welding machine close about top and bottom mattress layers with the baffle and floating die in position. A narrow axially extending slit in the die allows the die to be removed after the baffle is attached. After all baffles are suitably positioned, the mattress layers are closed.

2 Claims, 5 Drawing Figures 4,218,274

METHOD OF CONSTRUCTING A BAFFLED WATERBED MATTRESS

FIELD OF INVENTION

This invention relates to waterbed mattresses, and particularly to baffle structures therefor and means for welding the baffle structures in position.

DISCUSSION OF PRIOR ART

Waterbed mattresses now often include interior baffle structures in order to damp wave motions as well as for limiting the amplitude of up and down movement. One successful system utilizes a series of individual baffles each comprising superimposed layers of disk or like form peripherally connected together, the layers being respectively attached to the top and bottom mattress layers by generally circular welds substantially smaller than the perimeter of the layers. As the mattress layers separate when filled with water, the layers separate or involute, such as to a generally biconical form.

At least two methods are known for attachment of the disk pairs to the mattress layers. One method, described in application Ser. No. 865,995 filed on Dec. 30, 1977, now U.S. Pat. No. 4,172,301 by Everard and Mollura and entitled FLUID FILLED BEDS AND THE LIKE utilizes a separator inserted between the layers while external companion ring dies close about the mattress layers and the disks. Another method, described in my application Ser. No. 894,427 filed on Apr. 7, 1978, now U.S. Pat. No. 4,167,432 and entitled PROCESS OF MAKING A WATERBED MATTRESS utilizes a floating die inserted between the layers while external flat press elements close about the mattress layers and the disks. In either case, the forces tending to separate the mattress layers tend progressively to separate the welded layers from the outside margins of the ring welds. Rupture tends to occur at the layer in contact with the ring die. In one case, the outer mattress layer tends to rupture whereas in the other case, the disk layer tends to rupture. The latter arrangement is, of course, preferable in that water is yet contained; yet the baffle function may be partially or entirely lost.

OBJECTIVE

The primary object of the present invention is to provide an improved baffle structure in which forces tending to separate the mattress layers are effectively resisted without any tendency of the welds to peel and in which the welding is achieved from the inside in order to maintain the integrity of the outer mattress layers free of rupture.

SUMMARY OF INVENTION

In order to accomplish the foregoing objective, I provide a baffle that has a substantially spool shape. A central baffle web joins semi-rigid end attachment flanges. The web is located inside, rather than outside the region of the weld. Accordingly separation of the mattress layers produces a shear force rather than a progressive peel force at the weld region. In order to weld the flanges in place, I utilize a floating die comprising a hollow cylinder that surrounds the central baffle web during welding. An axial slit allows the floating die to be removed by passage of the web through the slit.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

Figure 1:
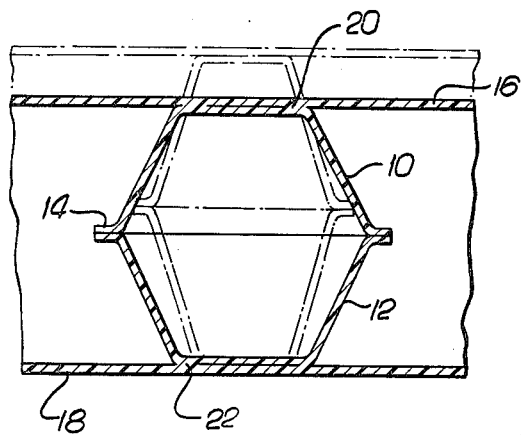
FIG. 1 is a diagrammatic vertical sectional view of a prior art mattress.

In FIG. 1 there is illustrated a typical prior art baffle structure for a waterbed mattress in which two layers or disks 10 and 12 are peripherally attached at 14. The central portions of the layers are respectively welded to the top and bottom mattress layers 16 and 18, as by circular welds 20 and 22. These welds are conveniently formed in one closing operation by a floating ring die inserted between the layers or by companion ring dies at the welding machine bed and head with a removable separator inserted between the layer. In either case, as the mattress layers separate under increased fill of water or in response to transient load, the baffle structure separates more and more as indicated in dotted lines. The welds 20 and 22 tend to peel away due to the configuration of the baffle structure.

Figure 2:
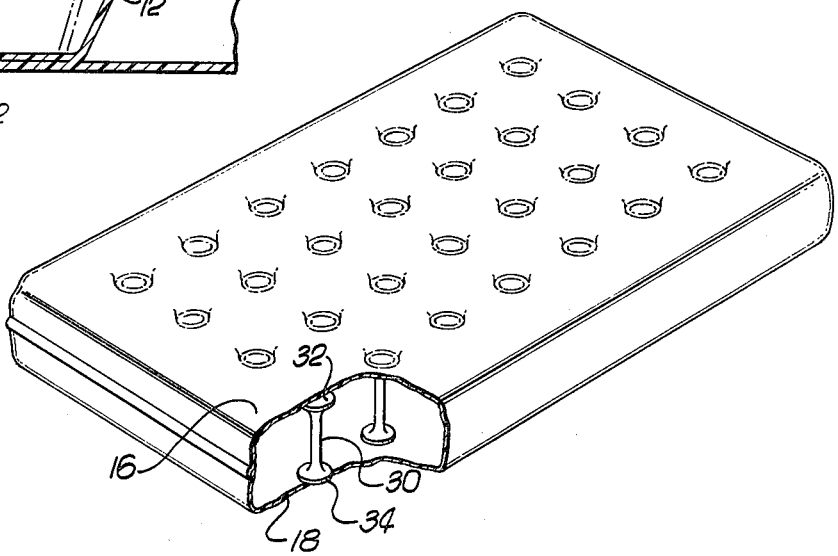
FIG. 2 is a pictorial view of a mattress incorporating the present invention, a corner of the mattress being broken away to show the interior structure.

In FIG. 2, there is illustrated a baffled mattress that reduces wave motion in the same manner as a mattress utilizing the baffle of FIG. 1. However, the danger of rupture is largely reduced if not eliminated. The baffles are arrayed uniformly throughout the operative area of the mattress. Each baffle is identical.

Each baffle is generally in the form of a small diameter cylindrical column 30, say 0.10 inches, more or less, terminated at the top and bottom by semi-rigid circular flanges 32 and 34 of, say 0.050 inches, more or less. The baffle may be made of molded plastic materials such as polyvinyl chloride. The central column 30 smoothly merges with the attachment flanges 32 and 34 as at 36 and 38 in order to eliminate the possibility of localizing stresses at that region.

Figure 3:
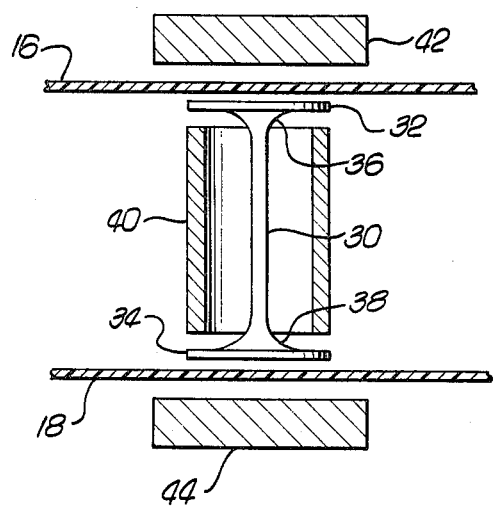
FIG. 3 is a diagrammatic view illustrating a baffle element surrounded by a floating cylindrical die preparatory to welding of the baffle flanges to the mattress layers.
Figure 4:
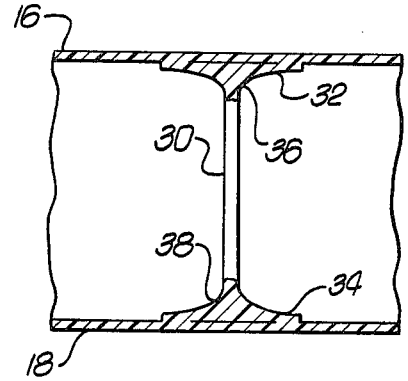
FIG. 4 is an enlarged vertical sectional view of the mattress taken along a plane corresponding to line 4—4 of FIG. 2.
Figure 5:
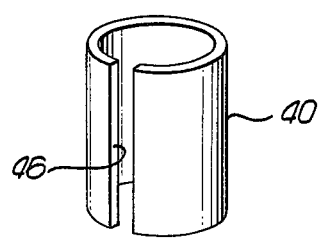
FIG. 5 is a pictorial view of the floating die.

As shown in FIG. 3, the baffle is attached by the aid of a floating ring die 40 that surrounds the baffle, the baffle being suitably positioned between the mattress layers 16 and 18. The die 40 is a hollow cylinder. Flat parts 42 and 44 of a dielectric welding machine close about the layers 16, 18 and the baffle structure. Heat generated at the circular ends of the floating die result in fusion or welding of the attachment flanges 32 and 34. In practice the welding machine may close on a row or two of baffles. When the machine opens, the ring die for each baffle is removed. This is achieved by a longitudinal slit 46 (FIG. 4) in the die 40 that is slightly larger than the column diameter of the baffle. The axial length of the floating die is preferably slightly less than the length of the baffle itself. After all the baffles are attached, the open parts of the mattress are closed and sealed. A usual filler plug (not shown) is positioned at a corner of the mattress.

Intending to claim all novel, useful and unobvious features shown or described, I make the following claims:

1. A method of constructing a baffled waterbed mattress:
    (a) which comprises attaching, to the upper and lower layers of a mattress bag, a series of individual plastic baffles each comprising a unitary structure with an attachment pad at opposite ends with a tying member extending between the pads leaving a peripheral pad area for attachment to the mattress layers;
    (b) said method including the welding of each baffle by the aid of a hollow floating die surrounding the tying member to engage, at opposite ends, said peripheral pad areas of the baffle while flat parts of a dielectric heating machine are closed about the mattress layers, the baffle and the floating die; and
    (c) removing the floating die from the attached baffle by the aid of a longitudinally extending slot in the floating die by passing the tying member through the slot;
    (d) finally closing the mattress layers.

2. The method as set forth in claim 1 in which the floating die used in the method is substantially cylindrical to provide a weld of near ring configuration.

* * * * *